June 10, 1941.　　　J. H. TOBLER　　　2,245,097
SHUTOFF VALVE
Filed Feb. 17, 1940
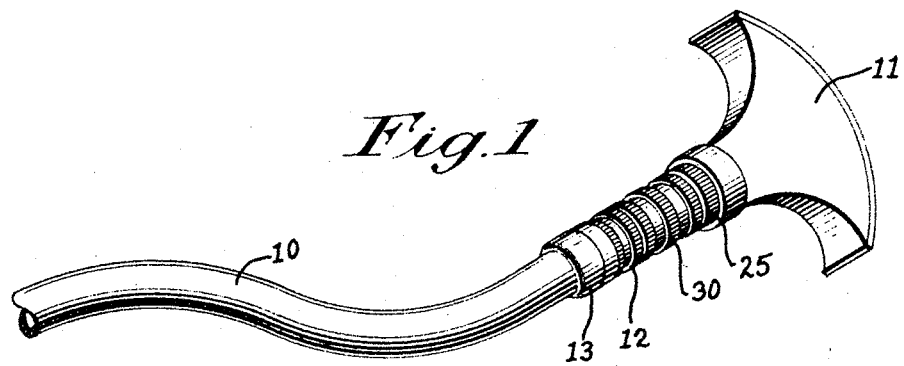
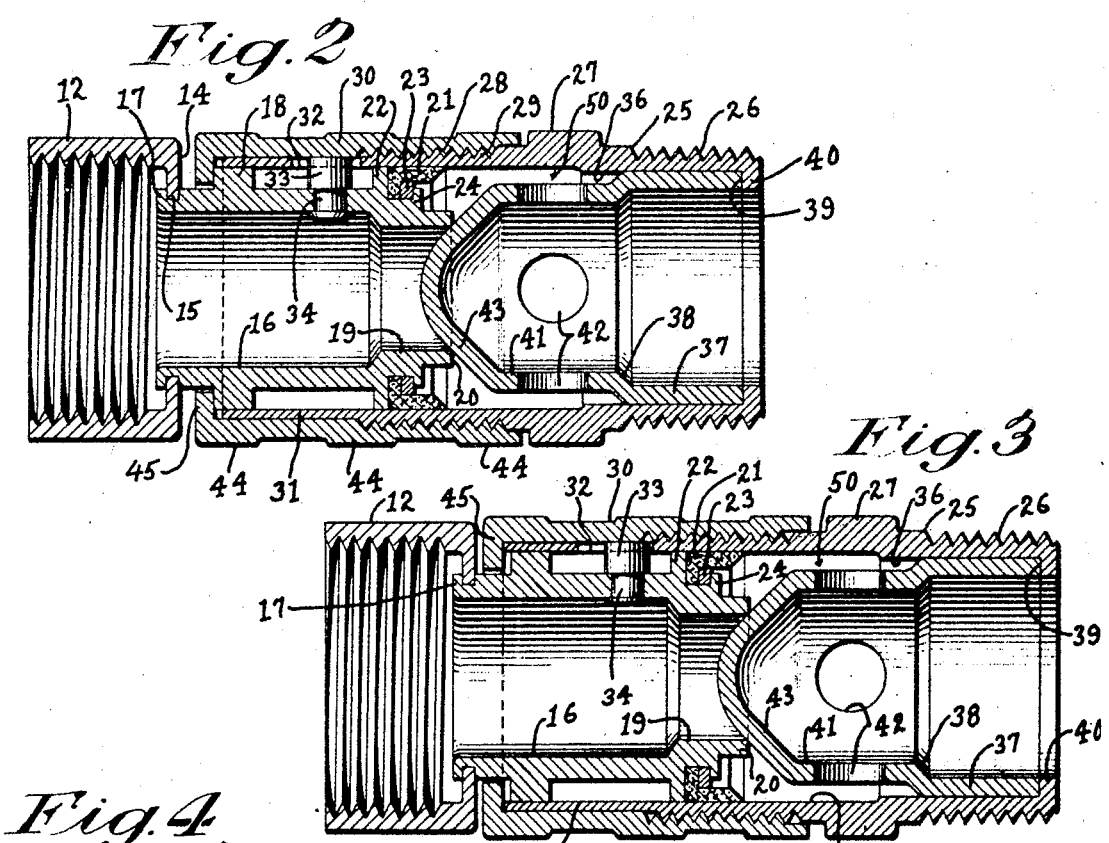
INVENTOR
John H. Tobler
BY
R. T. Sperry
ATTORNEY Patented June 10, 1941

2,245,097

UNITED STATES PATENT OFFICE 2,245,097

SHUTOFF VALVE

John H. Tobler, Waterbury, Conn., assignor to Scovill Manufacturing Company, Waterbury, Conn., a corporation of Connecticut Application February 17, 1940, Serial No. 319,453

3 Claims. (Cl. 251—8)

The present invention relates to valves and is particularly concerned with a shut-off valve which, while generally useful in various fluid circuit arrangements, is particularly suited for use with flexible hose and tubing. The present embodiment of the invention being admirably suited for use with common garden hose.

It is among the objects of the invention to provide a shut-off valve having improved structural features cooperating to provide for simplicity in operation and manufacture, and efficiency, effectiveness and durability in use.

More specifically, it is among the objects of the invention to provide a shut-off valve having a minimum number of parts without sacrificing either ease of manipulation or faithfulness in operation. It will further be noted that the structure and arrangement of parts is such as to lend themselves to ease and economy in manufacture and assembly.

Another object is to provide a shut-off valve in which the danger of leakage either of fluid through the valve when closed or fluid from between the valve parts is minimized and which will maintain its leak-proof characteristics throughout a long life of usefulness.

Similarly, it is among the objects to provide in a shut-off valve, a sealing device such as packing or a washer which is not subjected to fluid pressure when the valve is closed and which when fluid is flowing is not in the direct line of flow and which is thus protected from excessive pressures and friction.

Another very important object of the invention is to provide a shut-off valve, the operating member of which is in axial alignment with the valve body, thus combining ease of operation with a compact valve assembly avoiding any outwardly extending operating handles, wheels or keys.

A further object of the invention is to provide a combined shut-off valve and connector whereby the valve may readily fit into a fluid circuit arrangement between separate hose lengths or between hose and other equipment such, for instance, as a spray device.

Another important object is to provide in a shut-off valve, having aligned hose connectors or their equivalent, an operating member lying wholly and at all times within the confines of a space bounded by such connectors so as to avoid the use of any protruding parts.

Numerous other objects and features of the invention will be apparent from a consideration of the following specification when taken in connection with the accompanying drawing in which:

Figure 1 is a prospective view of one form of the present invention shown as applied between a garden hose and a spray nozzle;

Figure 2 is a detailed sectional view showing the valve closed;

Figure 3 is a view similar to Figure 2, illustrating the lost motion permitted between parts; and Figure 4 is a similar section showing the valve in fully opened position.

Briefly, the invention comprises a pair of axially movable valve members, preferably provided with hose couplings and joined by an operating member threadedly engaging one valve member to axially move thereover in response to rotation with respect thereto and loosely engaging the companion valve member to be freely rotatable with respect thereto but to impart relative axial movement between the valve members. A valve seat is carried by one member with which the other member engages upon axial movement whereby the fluid passage through the members is shut off. Packing is provided between the members to eliminate leakage of fluid from between the members and an important feature of the invention is the novel arrangement of structure eliminating fluid pressure upon the packing when the valve is closed and placing the packing out of the direct path of fluid while flowing.

Referring now to the drawing, in Figure 1, the valve is disclosed as applied between a garden hose 10 and a fan type spray nozzle 11. Although this use is obviously only one of many applications of the device, it finds particular utility in such an application since many of the illustrated types of nozzles do not have a valve embodied therein and in this arrangement the valve acts both as a valve and a connector between the hose and the nozzle.

As is more clearly shown in the sectional views, the device includes an internally threaded coupling nut 12 adapted for threaded engagement with an externally threaded nipple of the type commonly found on garden hose and as indicated by the numeral 13 in Figure 1. The inner end of the nut 12 is provided with an inturned flange 14 having a peripheral lip 15 which engages an outer end of an internal valve cylinder 16. The outer end 17 of the valve cylinder 16 is turned out as by a spinning operation to engage the lip 15 of the nut 12 to form a rigid leak-proof connection. Intermediate the ends of the cylinder, its outer wall is provided with an annular shoulder 18 which cooperates with an operating member, hereinafter described, to cause relative longitudinal movement of the parts. The inner end of the cylinder 16 terminates in a reduced neck 19 the open end 20 of which constitutes the valve seat.

The neck 19 is surrounded externally by a packing in the form of a cup washer 21 secured between a second annular shoulder 22 on the cylinder body and a retaining ring 23 the latter being secured under an annular lip 24 adjacent the valve seat 20.

The valve body 25 is also of hollow cylindrical configuration, its outer end being externally threaded as at 26 to facilitate its engagement with a spray nozzle, as shown in Figure 1 or with an additional length of hose or with such other equipment as may be desired.

Adjacent the threads 26 the body is provided with a knurled shoulder 27 providing an operating grip inwardly of which the outer surface of the body is externally threaded as at 28 to receive the internal threads 29 of the operating member 30. The inner end of the body 25 terminates in an internally and externally smooth skirt 31 the wall of which is slotted as at 32 to receive the head 33 of a stud or rivet 34 which is mounted upon the cylinder 16. While the rivet acts to preclude rotary motion between cylinder 16 and body 25 while permitting limited longitudinal motion therebetween its primary purpose is to act as a stop limiting the amount of movement of cylinder and body away from each other and thus precluding accidental disassembly of the device.

Throughout the major portion of the body 25 its internal surface is of uniform diameter providing a cylindrical surface 35 which receives and guides the washer 21 permitting movement of the body towards and from the cylinder but maintaining a fluid-tight seal between the body and the outer surface of the cylinder, thus effectively precluding leakage of fluid from the inner open end of the body.

The internal diameter of the body 25 is reduced at its outer end as at 36 and has rigidly fitted therein the skirt 37 of a valve member 38, the outer open end 39 of which abuts a stop flange 40 turned inwardly from the outer open end of the body 25. The valve member 38 may be described as cup shaped having a reduced neck 41 apertured as at 42 and terminating in a conical dome 43 which constitutes the valve proper. It will, of course, be seen that the reduced diameter of the valve neck 41 in conjunction with the enlarged internal diameter of the body 25 adjacent the neck provides an annular chamber 50 permitting, when the valve is open, the passage of fluid from the cylinder through the apertures 42.

The operating member 30 is generally cylindrical of form, its internal threads 29 engaging the threads 28 of the body 25. Its external surface is provided with grips constituted by the three raised and knurled bands 44. Adjacent the coupling nut 12, the end of the operating member 30 is provided with an inwardly extending operating flange 45 mounted between the cylinder shoulder 18 and the flange 14 of the nut 12.

From an inspection of Figures 2, 3 and 4, it will be seen that since the operating member 30 is secured against any substantial relative longitudinal movement with respect to the nut 12 and cylinder 16, rotary motion between the operator and the body 25 will by virtue of the threaded engagement therebetween move the body 25 towards or away from the nut 12 and cylinder 16. It will further be seen that since the valve member 38 is rigidly mounted within the body that such longitudinal movement will move the valve dome 43 towards or away from the valve seat 20 so that when the parts are as shown in Figure 2 the dome will be firmly seated upon the seat 20 preventing the flow of fluid from the cylinder 16 to the chamber 50. It will also be noted that since the washer 21 faces the chamber 50 no pressure is upon the washer when the valve is closed as in Figure 2, when the valve is open, as in Figure 4, it will be noted that the fluid flow is from the cylinder mouth through chamber 50 to apertures 42 and that the washer is not in the direct line of such flow and is thus not subjected to constant friction of fluid passing thereover, it will further be noted that the cup-shaped characteristic of the washer provides for an increasing of its sealing ability in response to pressure applied thereon from the chamber 50.

By reference more particularly to Figure 3, it will be noted that in that form of the invention, here shown, the inturned actuating flange 45 of the operating member 30, is of less width than the distance between the flange 14 and shoulder 18, and thus a slight lost motion is permitted for the actuating member. It will also be seen that a similar slight freedom of motion is permitted between the valve cylinder and the body at such times as the actuating member is in intermediate position. As shown in Figures 2 and 4, however, no such freedom of motion is permitted when the actuator is in its extreme positions. Such lost motion construction is in no way essential to the invention, however, it is found in the present commercial construction and provide for ease in manufacture, assembly and operation. Such tolerances lend a slight floating action to the sleeve and packing within the body which not only gives the assembly a flexibility calculated to enhance its useful life, but permits accurate seating of the dome upon the valve seat 20.

It will, of course, be understood that the invention is in no way limited to the specific structural features here shown, and that certain features may be omitted or elaborated upon, and that various changes and modifications may be resorted to, and the full use of equivalents embodied in the device without departing from the invention as outlined in the appended claims.

I claim:

1. In a shut-off valve, a cylindrical body, valve means fixed within said body and comprising an apertured sleeve, a portion of which is spaced from the inner walls of said body and terminated in a domed valve end, a cylindrical valve seat member slidably mounted within said body, the inner end of said valve seat member being reduced and forming a valve seat adapted to receive said domed valve end, a washer surrounding the reduced inner end of said valve seat and located in spaced relation to said valve seat, said washer engaging the inner wall of said body and constituting a seal for the chamber formed between said body and the portion of said sleeve which is spaced therefrom, means fixedly securing said washer in place and means inseparably connecting said valve member to said valve seat member.

2. In a shut-off valve, a cylindrical body, valve means fixed within said body and comprising an apertured sleeve a portion of which is spaced from the inner walls of said body and terminated in a domed valve end, a cylindrical valve seat member slidably mounted within said body, the inner end of said valve seat member being reduced and forming a valve seat adapted to receive said domed valve end, a cup washer surrounding the reduced inner end of said valve seat and located in spaced relation to said valve seat, said washer engaging the inner wall of said body and constituting a seal for the chamber formed between said body and the portion of said sleeve which is spaced therefrom, and rotary operating means engaging said body and said valve seat member to produce related longitudinal movement of said valve seat member and said body.

3. In a shut-off valve, a cylindrical body, valve means fixed within said body and comprising an apertured sleeve a portion of which is spaced from the inner walls of said body and terminated in a domed valve end, a cylindrical valve seat member slidably mounted within said body, the inner end of the valve seat member being reduced and forming a valve seat adapted to receive said domed valve end, a washer surrounding the reduced inner end of said valve seat and located in spaced relation to said valve seat, said washer engaging the inner wall of said body and constituting a seal for the chamber formed between said body and the portion of said sleeve which is spaced therefrom, rotary operating means engaging said body and valve seat member to produce relative longitudinal movement therebetween, means for limiting the amount of such longitudinal movement and a lost motion connection between such operating means and said valve seat member to permit free rotation of said operating means when said body and valve seat member are between their limiting positions.

JOHN H. TOBLER.